United States Patent
Basesme

(10) Patent No.: US 10,001,227 B2
(45) Date of Patent: Jun. 19, 2018

(54) HOUSEHOLD APPLIANCE COMPRISING A LOCKING ELEMENT

(71) Applicant: ARCELIK ANONIM SIRKETI, Istanbul (TR)

(72) Inventor: Tugrul Basesme, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days. days.

(21) Appl. No.: 15/102,270

(22) PCT Filed: Oct. 30, 2014

(86) PCT No.: PCT/EP2014/073276
§ 371 (c)(1),
(2) Date: Jun. 6, 2016

(87) PCT Pub. No.: WO2015/082139
PCT Pub. Date: Jun. 11, 2015

(65) Prior Publication Data
US 2016/0312921 A1    Oct. 27, 2016

(30) Foreign Application Priority Data
Dec. 4, 2013    (TR) ............... a 2013 14196

(51) Int. Cl.
*F16L 3/237*    (2006.01)
*D06F 39/08*    (2006.01)
(Continued)

(52) U.S. Cl.
CPC ........... *F16L 3/237* (2013.01); *A47L 15/4214* (2013.01); *A47L 15/4217* (2013.01);
(Continued)

(58) Field of Classification Search
CPC ............. A47L 15/4217; A47L 15/4219; A47L 15/4214; A47L 15/4291; F16L 3/237;
(Continued)

(56) References Cited

U.S. PATENT DOCUMENTS 4,079,970 A * 3/1978 Brett ................ F16L 23/04
285/124.3
4,730,630 A * 3/1988 Ranft ................ A47L 15/42
134/109

(Continued)

FOREIGN PATENT DOCUMENTS

DE    202005019175 U1    5/2006
EP        2113702 A2      11/2009
(Continued)

OTHER PUBLICATIONS

International search report for PCT application No. PCT/EP2014/073276 and references contained therein are considered to be closest material prior art and any additional references cited in the application merely define the general state of the art and/or are duplicative.

(Continued)

*Primary Examiner* — Hiwot E Tefera
(74) *Attorney, Agent, or Firm* — Kilpatrick Townsend & Stockton LLP

(57) ABSTRACT

The present invention relates to a household appliance (1) comprising a body (2), a water tank (5) that is disposed on the body (2) or inside the body (2) and used for purposes like regeneration or storing water, two or more hoses (4) that enable water to be transferred from the water tank (5) to the outside and to be delivered into the water tank (5), two or more housings (3) that are disposed on the water tank (5) and that enable the hoses (4) to be connected to the water tank (Continued)

Figure 1:
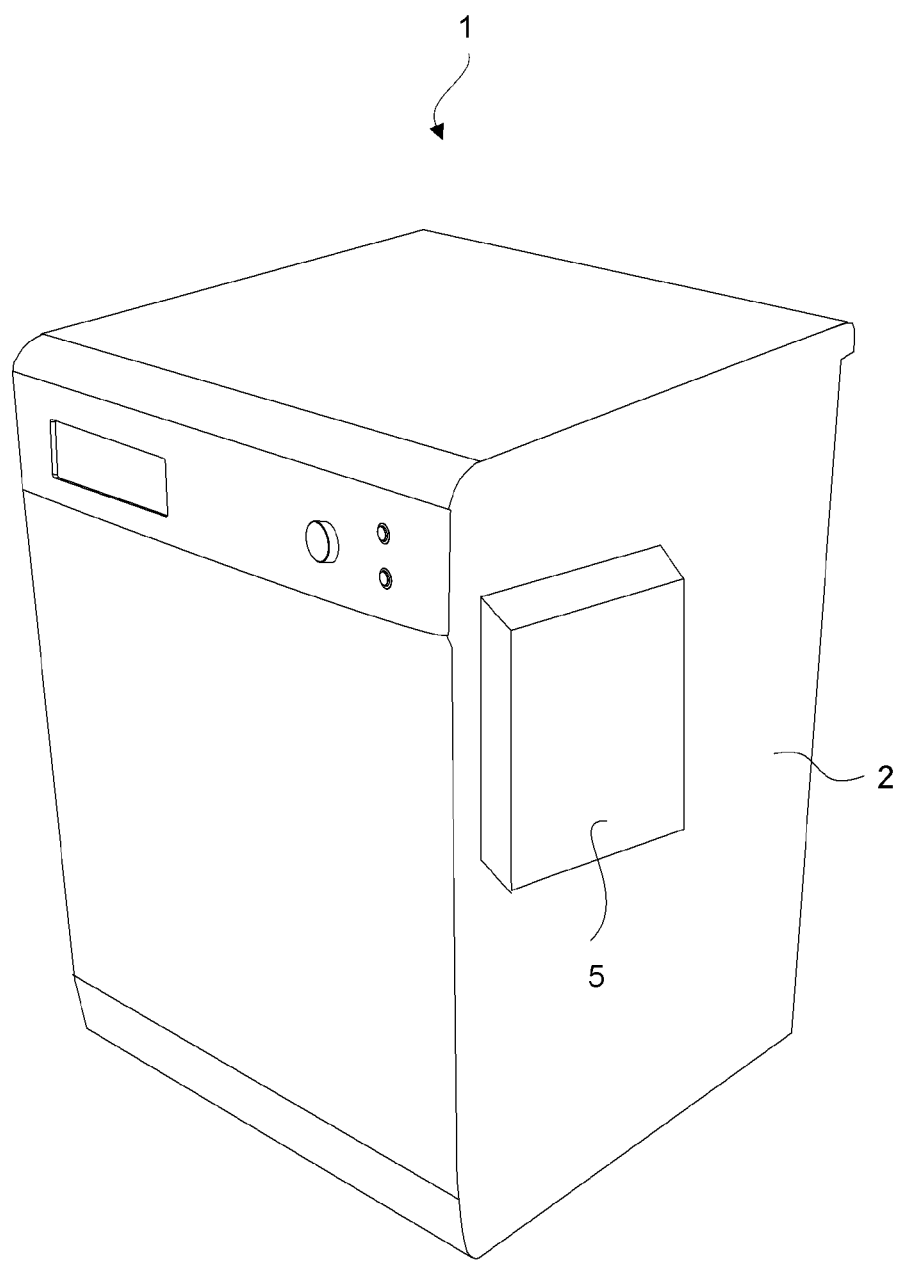

(5), and two or more circular connection regions (12) wherein the hoses (4) are mounted to the housings (3).

18 Claims, 6 Drawing Sheets

(51) Int. Cl.
    *A47L 15/42*     (2006.01)
    *D06F 39/00*     (2006.01)
    *D06F 29/00*     (2006.01)
    *D06F 58/20*     (2006.01)

(52) U.S. Cl.
    CPC ....... *A47L 15/4219* (2013.01); *A47L 15/4291* (2013.01); *D06F 29/005* (2013.01); *D06F 39/006* (2013.01); *D06F 39/08* (2013.01); *D06F 39/083* (2013.01); *D06F 39/088* (2013.01); *D06F 58/20* (2013.01); *D06F 39/081* (2013.01)

(58) Field of Classification Search
    CPC ..... F16L 3/2235; F16L 3/1075; F16L 37/008; F16L 3/22; F16L 21/06; F16L 37/12; F16L 37/56; F16L 39/02; F16L 39/00; F16L 23/036; D06F 39/083; D06F 29/005; D06F 58/20; D06F 39/088; D06F 39/08; D06F 39/081; D06F 39/006; Y10T 24/3444
    USPC ...... 248/68.1, 74.1, 62, 67.7, 74.2; 285/111, 285/406, 124.1–124.5; 68/207, 208
    See application file for complete search history.

(56) References Cited

U.S. PATENT DOCUMENTS

| | | | | |
|---|---|---|---|---|
| 4,981,024 A * | 1/1991 | Beldham | ............... | D06F 39/022 194/243 |
| 5,234,185 A * | 8/1993 | Hoffman | ................... | F16L 5/14 248/56 |
| 5,669,590 A * | 9/1997 | Przewodek | ............. | F16L 3/221 248/68.1 |
| 5,931,184 A * | 8/1999 | Armenia | ................ | F16L 39/005 137/312 |
| 6,311,936 B1 * | 11/2001 | Herr | ........................ | D06F 39/12 138/107 |
| 6,354,600 B1 | 3/2002 | Jung | | |
| 6,758,500 B2 * | 7/2004 | Lehnhardt | ............... | F16L 23/06 285/111 |
| 7,241,071 B2 * | 7/2007 | Carraher | .................. | E04C 5/163 403/164 |
| 7,637,538 B2 * | 12/2009 | Tchang | ................. | F28F 9/0246 285/124.3 |
| 8,807,151 B2 * | 8/2014 | Busing | ................ | A47L 15/4217 134/201 |
| 9,777,425 B2 * | 10/2017 | Lee | ........................ | D06F 39/083 |
| 2003/0197381 A1 * | 10/2003 | Lehnhardt | ............... | F16L 21/06 285/364 |
| 2007/0101774 A1 * | 5/2007 | Lee | ........................ | D06F 39/083 68/208 |
| 2010/0018258 A1 * | 1/2010 | Cho | ....................... | D06F 39/088 68/17 R |
| 2010/0243005 A1 | 9/2010 | Büsing et al. | | |
| 2011/0041561 A1 * | 2/2011 | Apel | ........................ | D06F 39/04 68/12.02 |
| 2012/0255330 A1 * | 10/2012 | Wanweerakul | ........ | D06F 39/083 68/208 |

FOREIGN PATENT DOCUMENTS

| | | |
|---|---|---|
| EP | 2409632 A1 | 1/2012 |
| WO | 2005095806 A1 | 10/2005 |

OTHER PUBLICATIONS

Written opinion of the international searching authority for PCT application No. PCT/EP2014/073276 and references contained therein are considered to be closest material prior art and any additional references cited in the application merely define the general state of the art and/or are duplicative.

\* cited by examiner

HOUSEHOLD APPLIANCE COMPRISING A LOCKING ELEMENT

The present invention relates to a household appliance comprising a locking element that enables the grouped components to be interlocked so as not to be dislodged.

In household appliances, hoses or pipes that enable water to be discharged from the household appliance or to be delivered from the mains to the household appliance are grouped together and mounted to the household appliance. The use of the locking element during the grouping and fixing operations is known. Dislodging of the hoses from the housing whereto they are mounted results in damaging of the household appliance and also losses in time and energy. Therefore, the hoses should be fixed to the household appliance firmly.

In the state of the art Patent Document No. WO2005095806, a domestic appliance is disclosed which comprises detent elements and a detent counter-elements.

The aim of the present invention is the realization of a household appliance having a locking element that is mounted easily and firmly.

The household appliance realized in order to attain the aim of the present invention, explicated in the first claim and the respective claims thereof, comprises a body, a water tank that is disposed on the body or inside the body and used for the purposes of regeneration, water storage, two or more housings disposed on the water tank, two or more hoses that are mounted on the housing and that open into the water tank, and two or more circular connection regions where the hoses and the housings are joined. The household appliance comprises a locking element that has four or more even numbers of arc-shaped clamps suitable to be mounted on the hoses and that locks the hoses to one another by the clamps being placed almost oppositely so as to surround the hoses by rotating around the hose whereon they are mounted. Each clamp pair is mounted around the connection regions so as to surround a single connection region oppositely.

In an embodiment of the present invention, the locking element has a free position wherein one of the clamps is mounted on one of the hoses, a semi-free position wherein the adjacent clamp is rotated to be positioned opposite to the clamp mounted on the hose and a locking position wherein the free clamps are rotated to be aligned with another hose and fitted oppositely thereon.

In an embodiment of the present invention, the locking element comprises a connection element that extends between two clamps mounted on two hoses and that enables the clamps to rotate around the hose they are mounted on. Thus, when the clamps at one end of the connection element are mounted on a hose to be positioned oppositely, the clamps at the other end of the connection element are moved freely and aligned with another hose.

In an embodiment of the present invention, the locking element comprises a joint that extends between two adjacent clamps grouped together on the hose so as to be positioned almost oppositely and that connects the clamps to one another so as to move. By means of the joint, the adjacent clamps are enabled to be grouped on the hose without their movement being limited. Thus, the assembly of the locking element is facilitated.

In an embodiment of the present invention, the locking element comprises a claw disposed on the clamp and an opening arranged on the connection element, wherein the claw is inserted so as to join the two opposite clamps. The adjacent clamps are joined on the hose by means of the claw and the opening.

In an embodiment of the present invention, the clamp is shaped as a ring situated around the hose.

In an embodiment of the present invention, the locking element comprises a first flange disposed around the hose, a second flange disposed around the housing and the clamps that lock the hoses to the housings by surrounding the first flange and the second flange in the connection region.

In an embodiment of the present invention, the household appliance is a dishwasher.

In another embodiment of the present invention, the household appliance is a laundry washing and/or drying machine.

The model embodiments relating to the household appliance realized in order to attain the aim of the present invention are illustrated in the attached figures, where:

FIG. 1—is the schematic view of a household appliance.

Figure 2:
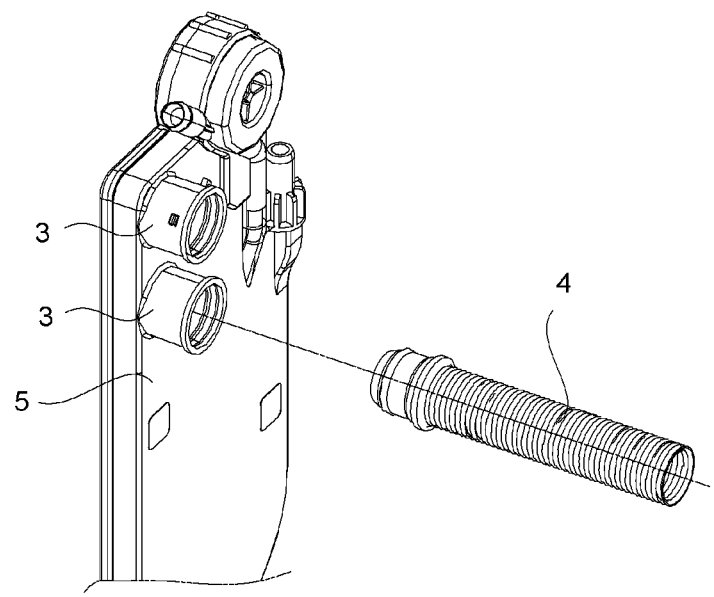

FIG. 2—is the perspective view of the water tank, the housing and the hose related to an embodiment of the present invention.

Figure 3:
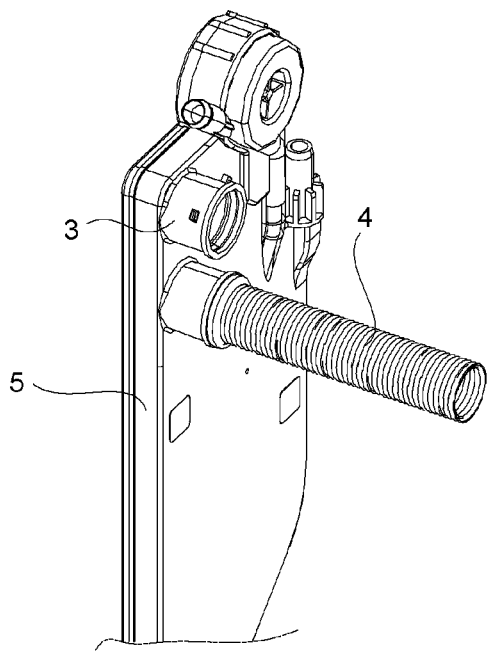

FIG. 3—is the perspective view of the water tank, the housing and the hose related to an embodiment of the present invention when the hose is mounted on the housing.

Figure 4:
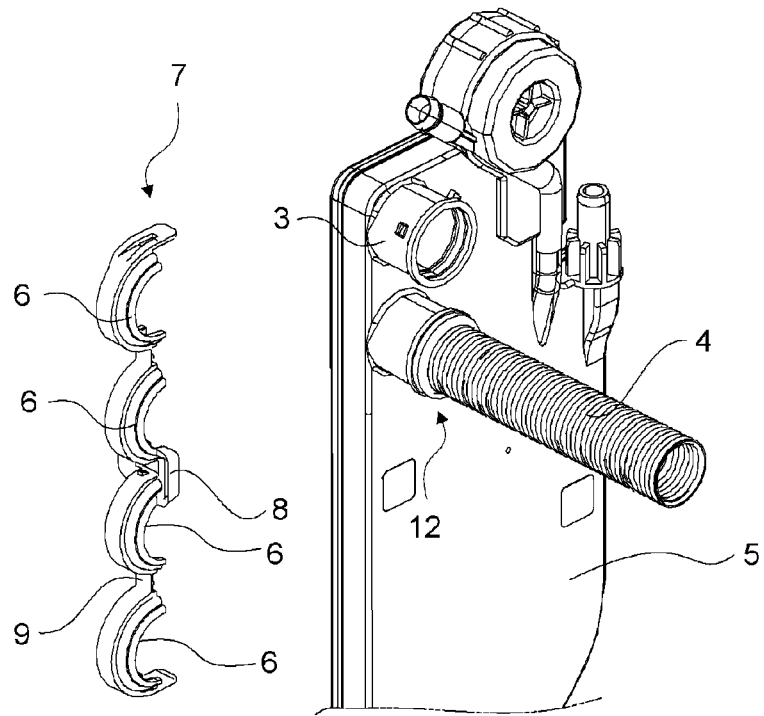

FIG. 4—is the perspective view of the water tank, the housing, the hose and the locking element related to an embodiment of the present invention.

Figure 5:
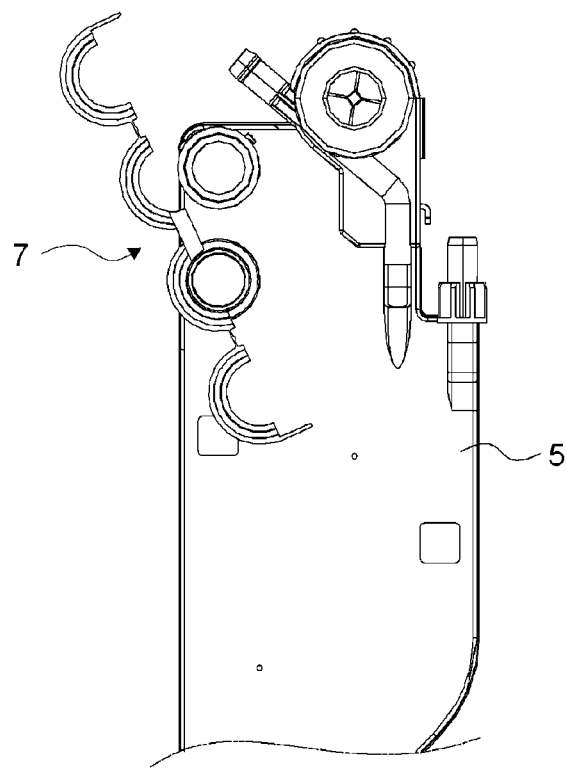

FIG. 5—is the perspective view of the water tank, the housing, the hose and the locking element related to an embodiment of the present invention when the locking element is in the free position.

Figure 6:
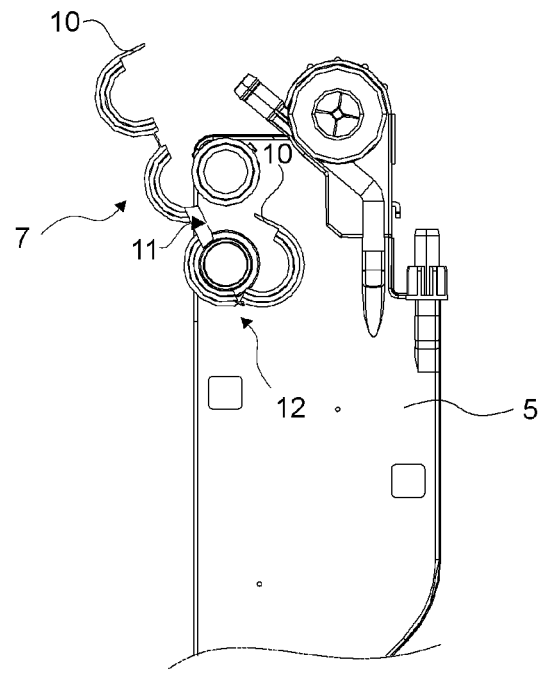

FIG. 6—is the perspective view of the water tank, the housing, the hose and the locking element related to an embodiment of the present invention while the locking element changes from the free position to the semi-free position.

Figure 7:
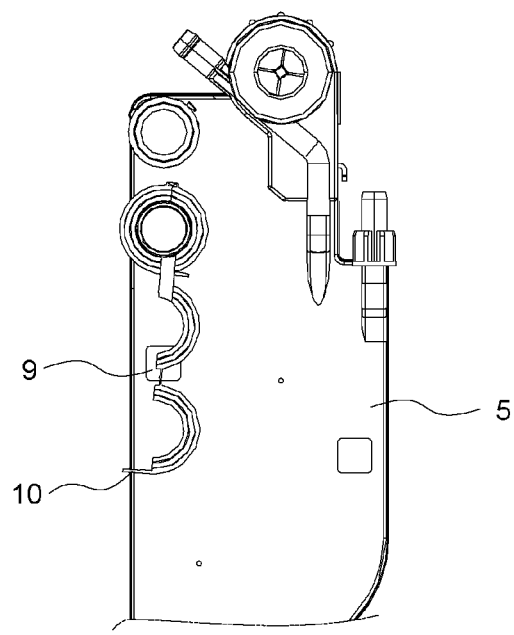

FIG. 7—is the perspective view of the water tank, the housing, the hose and the locking element related to an embodiment of the present invention when the locking element is in the semi-free position.

Figure 8:
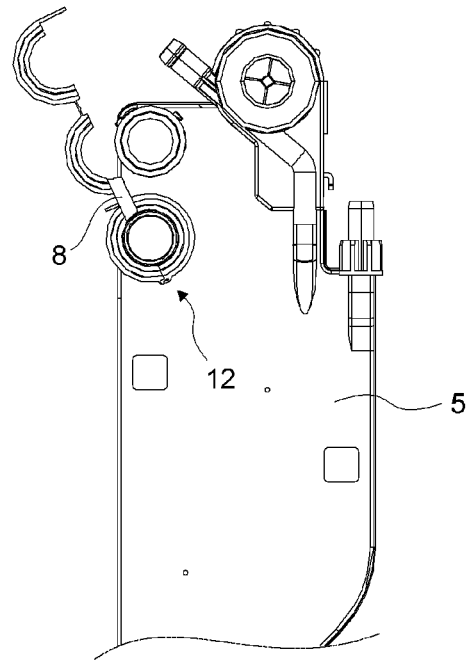

FIG. 8—is the perspective view of the water tank, the housing, the hose and the locking element related to an embodiment of the present invention while the locking element changes from the semi-free position to the locking position.

Figure 9:
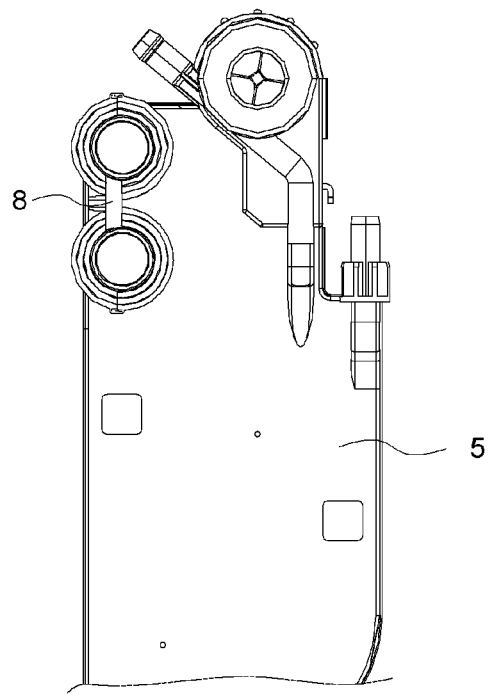

FIG. 9—is the perspective view of the water tank, the housing, the hose and the locking element related to an embodiment of the present invention when the locking element is in the locking position.

Figure 10:
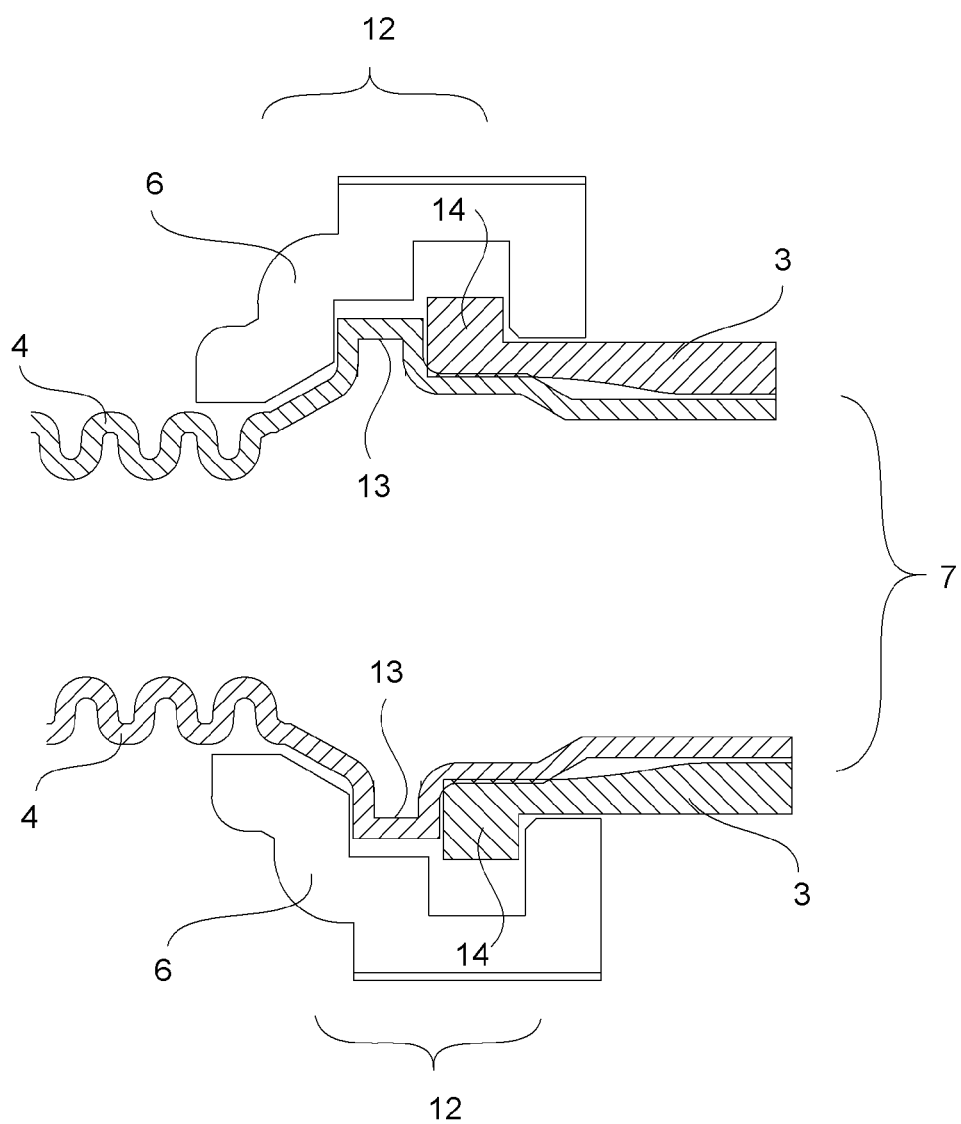

FIG. 10—is the cross-sectional view of the connection region and the locking element mounted thereon related to an embodiment of the present invention.

The elements illustrated in the figures are numbered as follows:

1. Household appliance
2. Body
3. Housing
4. Hose
5. Water tank
6. Clamp
7. Locking element
8. Connection element
9. Joint
10. Claw
11. Opening
12. Connection region
13. First flange
14. Second flange The household appliance (1) comprises a body (2), a water tank (5) that is disposed on the body (2) or inside the body (2) and used for purposes like regeneration or storing water, two or more hoses (4) that enable water to be transferred from the water tank (5) to the outside and to be delivered into the water tank (5), two or more housings (3) that are disposed on the water tank (5) and that enable the hoses (4) to be connected to the water tank (5), and two or more circular connection regions (12) wherein the hoses (4) are mounted to the housings (3). The hoses (4) enable water to be discharged from the household appliance (1) or to be delivered from the mains to the household appliance (1).

The household appliance (1) of the present invention comprises a locking element (7) that has four or more even numbers of arc-shaped clamps (6) produced as a single piece and connected to each other from the sides and that locks the hoses (4) and the housings (3) to one another by each pair of clamp (6) being mounted around the connection regions (12) so as to surround a single connection region (12) oppositely.

In an embodiment of the present invention, the locking element (7) has a free position wherein one of the clamps (6) is mounted on one of the hoses (4), a semi-free position wherein two adjacent clamps (6) are grouped on the hose (4) so as to almost entirely surround the hose (4) and a locking position, to which the locking element (7) is changed from the semi-free position by being rotated around the hose (4), wherein two adjacent clamps (6) are grouped on another hose (4).

In an embodiment of the present invention, the locking element (7) comprises a connection element (8) that extends between two clamps (6) mounted on two hoses (4) and that enables the locking element (7) to rotate around the hose (4) whereon it is mounted. Thus, when the clamps (6) at one end of the connection element (8) are mounted on a hose (4) so as to be positioned oppositely, the clamps (6) at the other end of the connection element (8) are moved freely to align with another hose (4).

In an embodiment of the present invention, the locking element (7) comprises a joint (9) that extends between two adjacent clamps (6) grouped together on the hose (4) so as to be positioned almost oppositely and that connects the clamps (6) to one another so as to move. By means of the joint (9), the adjacent clamps (6) are enabled to be grouped on the hose (4) without their movement being limited. Thus, the assembly of the locking element (7) is facilitated.

In an embodiment of the present invention, the locking element (7) comprises a claw (10) disposed on the clamp (6) and an opening (11) that is arranged on the connection element (8), wherein the claw (10) is inserted so as to join the two opposite clamps (6). The claw (10) is fitted into the opening (11), thus enabling the clamps (6) to be grouped so as to surround the hose (4).

In an embodiment of the present invention, the clamp (6) is semi circular. Two clamps (6) mounted on the hose (4) oppositely surround the hose (4) all around. By means of the semi circular clamps (6), the locking element (7) enables the clamp (6) pairs separated by the connection element (8) to be mounted on two hoses (4) and the hoses (4) to be fixed to the housing (3). Thus, an additional component is not required for grouping the hoses (4), assembly time is shortened and the assembly cost is decreased.

In an embodiment of the present invention, the household appliance (1) comprises a first flange (13) disposed around the hose (4), a second flange (14) disposed around the housing (3) and the locking element (7) having clamps (6) that lock the hoses (4) to the housings (3) by surrounding the first flange (13) and the second flange (14) all around in the connection region (12).

In an embodiment of the present invention, the household appliance (1) is a dishwasher.

In another embodiment of the present invention, the household appliance (1) is a laundry washing and/or drying machine.

By means of the present invention, a household appliance (1) is realized, wherein the assembly of the hose (4) is facilitated. By means of the locking element (7), an additional component is not required for the hoses (4) to be fixed to the housing (3) and to be grouped with each other. Thus, savings in assembly cost and assembly time are provided.

The invention claimed is:

1. A household appliance comprising:
    a body,
    a water tank that is disposed on the body or inside the body for regeneration or storing water,
    two hoses that enable water to be discharged from the water tank and to be delivered into the water tank,
    two housings that are disposed on the water tank and that enable the hoses to be connected to the water tank,
    two circular connection regions wherein the hoses are mounted to the housings,
    a locking element produced as a single piece comprising two pairs of arc-shaped clamps, each pair of clamps surrounds a single circular connection region of the two circular connection regions, each pair of clamps has a claw;
    the locking element further comprises a connection element between the two pairs of clamps, each claw is inserted into the connection element to lock the two pairs of clamps and lock the two housings and the two hoses to one another.

2. A household appliance as in claim 1, wherein the locking element has a free position wherein one of the clamps is mounted on a first hose among the hoses, a semi-free position wherein one of the two pairs of clamps is grouped on the first hose so as to almost entirely surround the first hose and a locking position, to which the locking element is changed from the semi-free position by being rotated around the first hose, wherein the other pair of the two pairs of clamps is grouped on the other one of the hoses.

3. A household appliance as in claim 1, wherein the connection element enables the locking element to rotate around one of the hoses whereon the locking element is mounted.

4. A household appliance as in claim 1, wherein the locking element comprises a joint that extends between two adjacent clamps grouped together around one of the hoses so as to be positioned almost oppositely and that connects the adjacent clamps to one another without limiting movement of the adjacent clamps.

5. A household appliance as in claim 3, wherein each claw is inserted in an opening on the connection element so as to join two opposite clamps.

6. A household appliance as in claim 1 wherein the clamps are semi-circular.

7. A household appliance as in claim 1, further comprising a first flange disposed around a first hose among the hoses, a second flange disposed around a first housing among the two housings, wherein the locking element locks the first hose to the first housing by surrounding the first flange and the second flange all around in the connection region.

8. A household appliance as in claim 1, which is a dishwasher.

9. A household appliance as in claim 1, which is a laundry washing and/or drying machine.

10. A household appliance as in claim 2, wherein the connection element enables the locking element to rotate around one of the hoses whereon the locking element is mounted.

11. A household appliance as in claim 2, wherein the locking element comprises a joint that extends between two adjacent clamps grouped together on one of the hoses so as to be positioned almost oppositely and that connects the adjacent clamps to one another without limiting movement of the adjacent clamps.

12. A household appliance as in claim 10, wherein each claw is inserted in an opening in the connection element so as to join two opposite clamps.

13. A household appliance as in claim 2 wherein the clamps are semi-circular.

14. A household appliance as in claim 2, further comprising a first flange disposed around a first hose among the hoses, a second flange disposed around a first housing among the two housings, wherein the locking element locks the first hose to the first housing by surrounding the first flange and the second flange all around in the connection region.

15. A household appliance as in claim 2, which is a dishwasher.

16. A household appliance as in claim 2, which is a laundry washing and/or drying machine.

17. A household appliance as in claim 4, wherein each claw is inserted in an opening in the connection element so as to join two opposite clamps.

18. A household appliance as in claim 11, wherein each claw is inserted in an opening in the connection element so as to join two opposite clamps.

* * * * *